US008718644B2

(12) United States Patent
Thomas et al.

(10) Patent No.: US 8,718,644 B2
(45) Date of Patent: May 6, 2014

(54) AUTOMATICALLY MODIFYING WIRELESS NETWORK CONNECTION POLICIES BASED ON USER ACTIVITY LEVELS

(75) Inventors: Tito Thomas, San Jose, CA (US); Kapil Chhabra, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/600,076

(22) Filed: Aug. 30, 2012

(65) Prior Publication Data
US 2013/0331101 A1 Dec. 12, 2013

Related U.S. Application Data

(60) Provisional application No. 61/657,405, filed on Jun. 8, 2012.

(51) Int. Cl.
*H04W 4/00* (2009.01)

(52) U.S. Cl.
USPC ........ 455/435.1; 455/449; 455/510; 455/512; 455/513; 370/338

(58) Field of Classification Search
USPC .............. 455/435.1, 445, 449, 510, 512, 513; 370/338
See application file for complete search history.

(56) References Cited

U.S. PATENT DOCUMENTS

| 7,369,850 | B2 * | 5/2008 | Andrew et al. ............. 455/435.1 |
| 7,693,530 | B1 * | 4/2010 | McKinney et al. ........... 455/510 |
| 8,090,395 | B2 | 1/2012 | Ngai et al. |
| 8,302,030 | B2 * | 10/2012 | Soroca et al. ................. 715/810 |
| 2003/0129979 | A1 | 7/2003 | Cooper |
| 2006/0084443 | A1 * | 4/2006 | Yeo et al. ...................... 455/449 |
| 2006/0104211 | A1 | 5/2006 | Islam et al. |
| 2009/0245176 | A1 * | 10/2009 | Balasubramanian et al. 370/328 |
| 2010/0268524 | A1 * | 10/2010 | Nath et al. ...................... 703/23 |
| 2010/0269044 | A1 * | 10/2010 | Ivanyi et al. .................. 715/736 |
| 2010/0278161 | A1 * | 11/2010 | Ore et al. ....................... 370/338 |
| 2011/0069685 | A1 | 3/2011 | Tofighbakhsh |
| 2011/0280258 | A1 | 11/2011 | Klingen |
| 2012/0158908 | A1 * | 6/2012 | Luna et al. .................... 709/217 |
| 2012/0191826 | A1 | 7/2012 | Gotesdyner et al. |
| 2012/0311684 | A1 * | 12/2012 | Paulsen et al. .................... 726/6 |

FOREIGN PATENT DOCUMENTS

| WO | 2008025003 | 2/2008 |
| WO | 2012102827 | 8/2012 |

OTHER PUBLICATIONS

International Search Report and Written Opinion from PCT/US2013/042686, mailed Oct. 1, 2013, Apple Inc., pp. 1-17.

* cited by examiner

*Primary Examiner* — Qun Shen
(74) *Attorney, Agent, or Firm* — Meyertons, Hood, Kivlin, Kowert & Goetzel, P.C.

(57) ABSTRACT

Modifying network connection policies of a wireless device based on user activity levels. One or more activity indicators of the wireless device may be monitored. One or more criteria for wireless network blacklisting may be selected based on the one or more activity indicators. The criteria may include different types of connectivity problems. A wireless network may be detected. The wireless network may be monitored for connectivity problems. The wireless network may be blacklisted if connectivity problems meeting the selected criteria for wireless network blacklisting are determined to have occurred.

15 Claims, 3 Drawing Sheets

AUTOMATICALLY MODIFYING WIRELESS NETWORK CONNECTION POLICIES BASED ON USER ACTIVITY LEVELS

PRIORITY CLAIM

The present application claims benefit of priority to U.S. Provisional Application No. 61/657,405 titled "Automatically Modifying Wireless Network Connection Policies Based on User Activity Levels" and filed on Jun. 8, 2012, whose inventors are Tito Thomas, and Kapil Chhabra, and which is hereby incorporated by reference in its entirety as thought fully and completely set forth herein.

FIELD OF THE INVENTION

The present application relates to wireless communication, and more particularly to a system and method for automatically modifying wireless network connection policies of a wireless device based on user activity levels.

DESCRIPTION OF THE RELATED ART

Presently, many user devices, such as cell phones, tablet computers, etc., maintain a list of preferred wireless networks (e.g., wi-fi networks) that they attempt to discover periodically. On discovering a preferred wireless network, such user devices attempt to join the network. However, in some situations, though a network is discoverable, the device is unable to connect to it.

For example, if the user device is at the edge of the network, the user device may be able to discover the access point, but the access point may be unable to receive transmissions from the user device.

As another example, if the access point security credentials have been re-configured and the user device is attempting to use a stale password to connect to the network, the user device may be unsuccessful.

A further example might include a scenario in which an access point is partially malfunctioning, such that the network is discoverable, but the access point cannot process connection requests.

In such situations, repeated attempts to connect to the problematic network can drain the battery. One possible solution could include identifying and blacklisting problematic networks. But at the same time, aggressive blacklisting can lead to bad user experience, e.g., where the device stops attempting to join a blacklisted network even when the network isn't problematic anymore. Accordingly, improvements in wireless network connection policies would be desirable.

SUMMARY OF THE INVENTION

In light of the foregoing and other issues, various embodiments are described herein of a system and method for automatically modifying wireless network connection policies of a wireless device based on user activity levels.

The system and method may include adjusting the aggressiveness of blacklisting problematic networks in different scenarios. For example, the aggressiveness of the blacklisting policy of the wireless device may depend on a user activity level. In this case, user experience and connectivity may be prioritized if the device is being used interactively, e.g., when the device is being actively used by a user, while power savings may be prioritized over connectivity if the device is not being used interactively, e.g., when the device is not being actively used by a user. Thus, in an 'interactive mode', the blacklisting policy may be selected to be less aggressive, while in a 'non-interactive mode', the blacklisting policy may be selected to be more aggressive.

Advantageously, such a policy may avoid excessively draining the battery of the wireless device by repeatedly attempting to join a problematic wireless network in situations in which the user is not actively attempting to use a wireless network connection. Such a policy may also avoid negatively impacting user experience by over-aggressively blacklisting a wireless network which experiences only a temporary problem, such as if a user at the edge of the range of a wireless network moves back into range of the network.

The disclosure includes a method for a wireless device to modify its network connection policies based on user activity levels, a wireless device configured to implement the method, and/or a computer accessible memory medium including program instructions executable to implement the method. The method may be performed as follows.

One or more activity indicators of the wireless device may be monitored. The activity indicators may include a display status, a touchscreen or keypad lock status, and/or a networking application status, among other possible activity indicators.

It may be determined that the wireless device is being used at a first user activity level of multiple possible user activity levels based on monitoring the one or more activity indicators of the wireless device. For example, the first user activity level may be a 'non-interactive' mode, e.g., in which the display is off, the touchscreen/keypad is locked, and/or no networking applications are active. A second user activity level of the multiple user activity levels might be an 'interactive' mode, e.g., in which the display is on, the touchscreen/keypad is unlocked, and/or one or more networking applications are active.

A first threshold for wireless network connection problems may be selected based on determining that the wireless device is being used at the first user activity level. A second threshold for wireless network connection problems may be selected if it is determined that the wireless device is being used at the second user activity level; the first and second thresholds may be different. The first and second thresholds may be criteria for wireless network blacklisting, in some embodiments. The criteria may relate to one or more types of connectivity problems, such as failed attempts to join a wireless network, and/or disconnections from a wireless network.

A wireless network may be detected. The wireless device may be configured to automatically attempt to join the wireless network, in some embodiments. For example, the wireless network may be identified in a list of preferred wireless networks stored by the wireless device; the wireless device may be configured to automatically attempt to join any available networks in the list of preferred wireless networks. Thus, the wireless device may automatically attempt to join the wireless network based on determining that the wireless network is identified in the list of preferred wireless networks.

The wireless network may be monitored for one or more types of connectivity problems, e.g., the types of connectivity problems specified by the criteria for wireless network blacklisting. For example, the wireless network may be monitored for unsuccessful attempts to join the wireless network and/or disconnections from the wireless network. Signal strength indicators for the wireless network may also be measured and stored as part of the monitoring process.

A first automatic attempt may be made to join the wireless network. The first attempt may be unsuccessful. In some embodiments, further (unsuccessful) automatic attempts may also be made to join the wireless network. After a certain number of unsuccessful attempts (e.g., equal to the first threshold), it may be determined that the wireless network meets the first threshold for wireless network connection problems, e.g., based on the unsuccessful attempt(s) to join the wireless network. Alternatively, or in addition, the wireless device may successfully join the wireless network but experience disconnection from the wireless network one or more times, such that the criteria for wireless network blacklisting are met.

Based on the wireless network meeting the selected criteria for wireless network blacklisting, the wireless network may be blacklisted. This may include storing information indicating not to attempt to join the wireless network. After storing this information (e.g., once the network has been blacklisted), the wireless device may not automatically attempt to join the wireless network.

At a later time, one or more of the activity indicators may change, e.g., as a result in a change in user activity level. Accordingly, it may be determined (e.g., based on monitoring the activity indicators) that the wireless device is being used at the second user activity level (e.g., interactive mode). As a result, the wireless network may be un-blacklisted; for example, the information indicating not to attempt to join the wireless network may be discarded. Once the wireless network is not blacklisted, one or more further attempts to join the wireless network may be made.

Additionally as a result of determining that the wireless device is being used at the second user activity level, a second threshold for wireless network connection problems (e.g., different criteria for wireless network blacklisting than is used at the first user activity level) may be selected. The second user activity level may be higher than the first user activity level (e.g., interactive as opposed to non-interactive), and as such the corresponding criteria for wireless network blacklisting may be less aggressive than the criteria for wireless network blacklisting corresponding to the first user activity level.

However, if the further attempts to join the wireless network are unsuccessful, or if a certain number of disconnections from the wireless network occur within a certain amount of time according to the criteria for wireless network blacklisting corresponding to the second user activity level, the wireless network may again be blacklisted. For example, information indicating not to attempt to join the wireless network may again be stored based on determining that the wireless network meets the second threshold for wireless network connection problems, and the wireless device may not automatically attempt to join the wireless network.

Note that the "more aggressive" wireless network blacklisting criteria corresponding to the first user activity level may include a lower number of failed attempts to join a wireless network, a lower number of disconnections within a certain amount of time, and/or a larger amount of time for a certain number of disconnections than the "less aggressive" wireless network blacklisting criteria corresponding to the second user activity level, according to various embodiments.

Also note that in some embodiments, the monitored signal strength indicators may also or alternatively be used to determine to un-blacklist a wireless network. For example, if signal strength indicators of the wireless network are measured during the unsuccessful first attempt to join the wireless network and again at a later time, and it is determined that signal strength of the wireless network has improved by a signal strength threshold, the wireless device may un-blacklist the wireless network and/or automatically perform another attempt to join the wireless network, e.g., based on determining that signal strength of the wireless network has improved by the signal strength threshold.

BRIEF DESCRIPTION OF THE DRAWINGS

A better understanding of the present subject matter can be obtained when the following detailed description of the embodiments is considered in conjunction with the following drawings.

Figure 1:
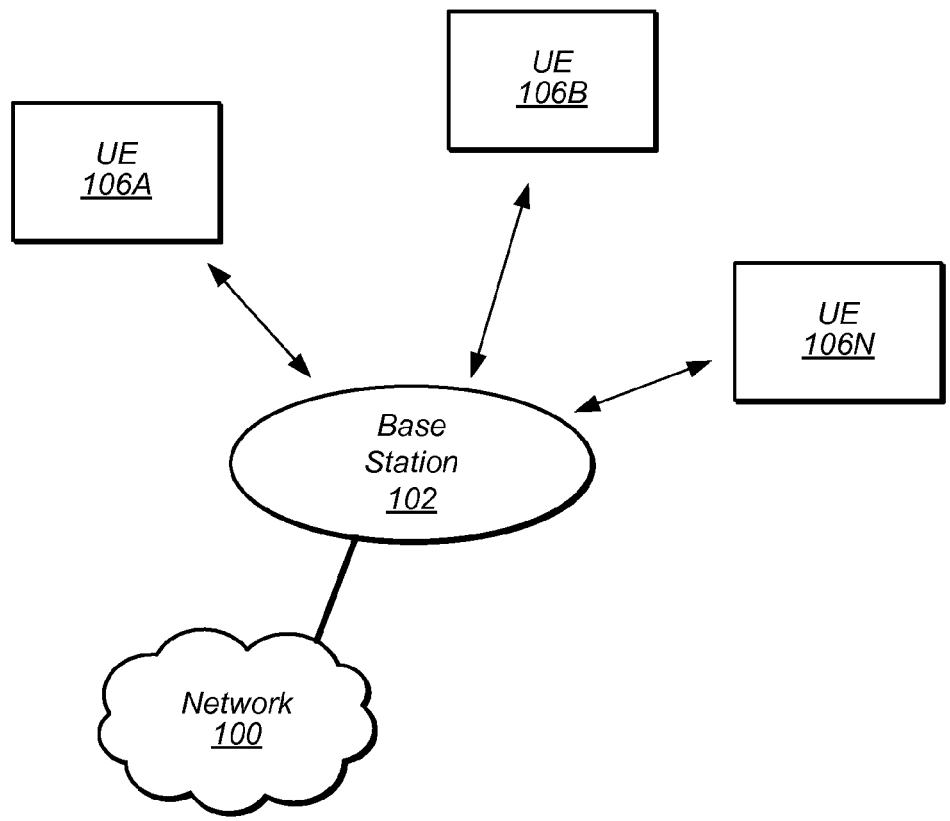
FIG. 1 illustrates an exemplary wireless communication system where multiple user devices communicate with an access point, according to one embodiment.

While the features describer herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Wireless Device—any of various types of computer systems devices which are mobile or portable and which performs wireless communications. Examples of wireless devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "wireless device" can be broadly defined to encompass any electronic, computing, and/or telecommunications device (or combination of devices) which is easily transported by a user and capable of wireless communication. A Wireless Device may also be referred to as a User Equipment ("UE").

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
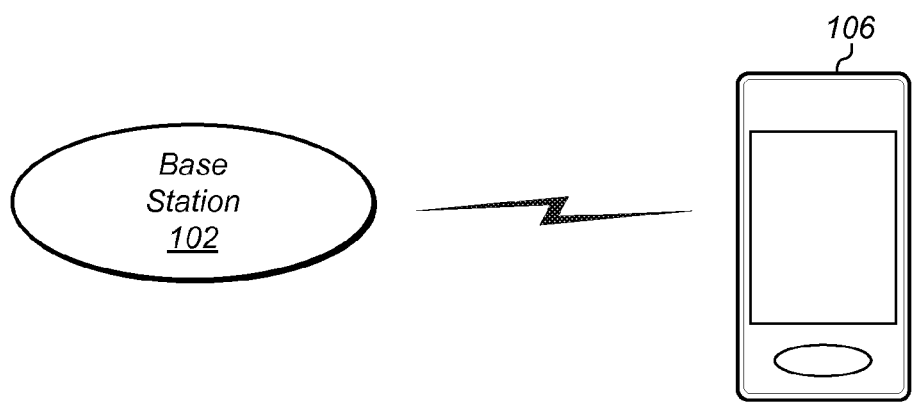
FIG. 2 illustrates an access point in communication with a wireless device.

FIGS. 1 and 2—Exemplary Communication System

FIGS. 1 and 2 illustrate an exemplary (and simplified) wireless communication system. It is noted that the system of FIG. 1 is merely one example of a possible system, and embodiments of the disclosure may be implemented in any of various systems, as desired.

As shown, the exemplary wireless communication system includes an access point 102 which communicates over a transmission medium with one or more wireless devices 106A through 106N. In some embodiments, the access point 102 may be an IEEE 802.11 (e.g., a, b, g, n, ac, etc.) wireless access point, or may be an access point of another wireless protocol (e.g., WiMAX, GSM, CDMA, LTE, etc.). The access point 102 may provide a connection to another network 100, such as the Internet. Thus, the access point 102 may allow wireless devices A-N to communicate with the Internet.

FIG. 2 illustrates wireless device 106 (e.g., one of the devices 106A through 106N) in communication with the access point 102. The wireless device 106 may be a device with wireless network connectivity such as a mobile phone, a hand-held device, a computer or a tablet, or virtually any type of wireless device. The wireless device 106 may include a processor that is configured to execute program instructions stored in memory. The wireless device 106 may perform any of the embodiments described herein by executing such stored instructions. In some embodiments, the wireless device 106 may include a programmable hardware element such as an FPGA (field-programmable gate array) that is configured to perform any of the method embodiments described herein, or any portion of any of the method embodiments described herein.

Figure 3:
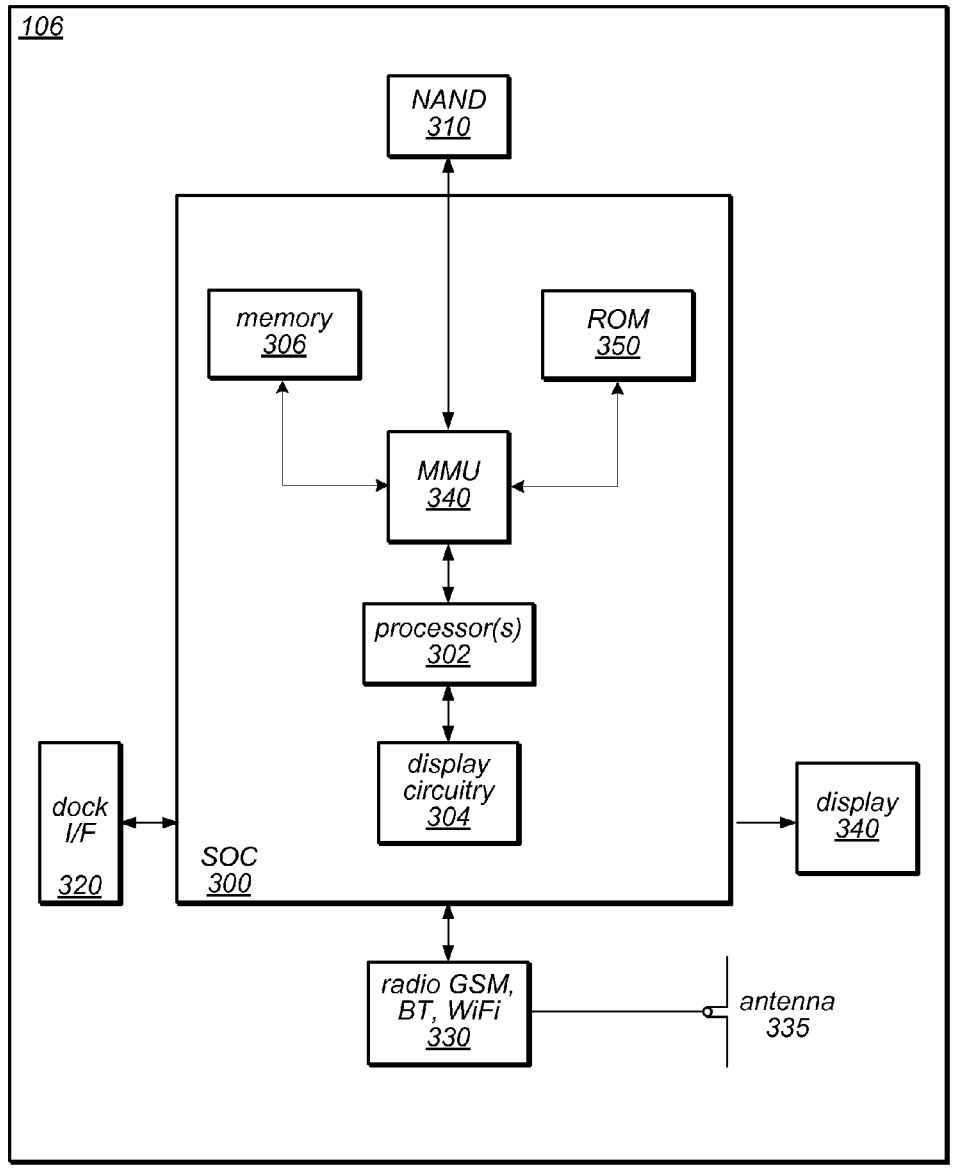
FIG. 3 illustrates an exemplary block diagram of a wireless device, according to one embodiment.

FIG. 3—Exemplary Block Diagram of a Wireless Device

FIG. 3 illustrates an exemplary block diagram of a wireless device 106. As shown, the wireless device 106 may include a system on chip (SOC) 300, which may include portions for various purposes. For example, as shown, the SOC 300 may include processor(s) 302 which may execute program instructions for the wireless device 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As also shown, the SOC 300 may be coupled to various other circuits of the wireless device 106. For example, the wireless device 106 may include various types of memory (e.g., including NAND flash 310), a connector interface 320 (e.g., for coupling to the computer system), the display 340, and wireless communication circuitry 330 (e.g., for LTE, CDMA, GSM, Bluetooth, WiFi, etc.) which may use antenna 335 to perform the wireless communication.

The hardware and/or software of the wireless device 106 may be used to implement various embodiments described herein. For example, the one or more of the memories of the wireless device 106 may store program instructions executable to implement embodiments discussed herein.

Figure 4:
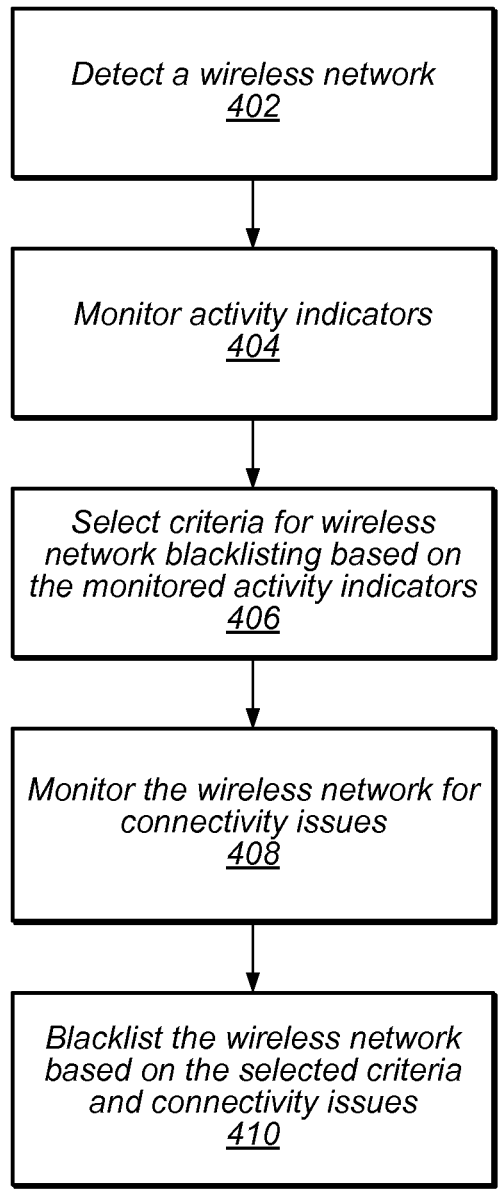
FIG. 4 is a flowchart diagram illustrating one embodiment of a method for automatically modifying wireless network blacklisting behavior of a wireless device.

FIG. 4—Automatically Modifying Wireless Network Blacklisting Behavior

Some wireless devices include functionality for automatically discovering and joining wireless networks. In some cases, such wireless devices may maintain a list of preferred networks which they will automatically attempt to discover, e.g., periodically. If a preferred network is discovered, the wireless device may automatically attempt to join the preferred network. However, under certain circumstances, it may be possible to discover a network but not to join the network.

Under such circumstances, repeated (e.g., automatic) attempts to join the network may drain the battery. Accordingly, it may be desirable to 'blacklist' such a problematic network in some cases. In this context, 'blacklisting' a network may mean avoiding automatic attempts to join the network for as long as the network is blacklisted.

It may be important to consider the user's experience when selecting the aggressiveness of such a blacklisting policy, however. For example, if a user is using the wireless device interactively, a less aggressive blacklisting policy may be preferable in order to give the wireless device the best chance of obtaining wireless connectivity on behalf of the active user. On the other hand, if the wireless device is not being actively used, a more aggressive blacklisting policy may be preferable in order to conserve battery for times when the user is interactively using the wireless device. Accordingly, some embodiments of the disclosure are directed to a system and method for automatically modifying wireless network blacklisting behavior based on user activity indicators. FIG. 4 illustrates one set of embodiments of such a method.

The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, one or more wireless networks may be detected by a wireless device. The wireless networks may be any of a variety of types of networks. For example, the wireless networks may include 802.11, Bluetooth, WiMAX, GSM, CDMA, LTE, and/or any other type of wireless networks. The wireless device may detect each network in a manner appropriate to the type of network. For example, if the network is an 802.11 network, an access point may transmit a beacon indicating the network service set identifier (SSID). The wireless device may thus receive the beacon signal and discover the wireless network. Other means of wireless network discovery may be appropriate for other types of wireless networks.

In some embodiments, the wireless device may automatically attempt to connect to a discovered wireless network. For example, in some embodiments, the wireless device may maintain a list of preferred networks, for which periodic automatic attempts to join the network may be made if the network is available. The wireless device might, for example, store network identification information and authentication information (e.g., password(s)) for such networks, and use such information in automatically discovering and/or automatically attempting to join such networks.

In 404, the wireless device may monitor activity indicators. The activity indicators may be any of a variety of possible criteria for determining a relative level of activity of the wireless device, and in particular of aspects of the wireless device which utilize wireless connectivity. Examples of indicators of activity level may include display status (e.g., display on or off), device lock status (e.g., screen and/or keypad/keyboard locked/unlocked), network application status (e.g., applications which use networking functionality, such as web browsers, email applications, etc., are or are not active), and/or other possible indicators of activity level.

According to some embodiments, if one or more activity indicators are present or true, the wireless device may be determined to be in an 'interactive mode'. Alternatively, in some embodiments, more than one (or all) activity indicators must be true to determine that the wireless device is in interactive mode. For example, in some embodiments, it may be sufficient for the wireless device to have the display on and/or the touchscreen/keypad unlocked to determine that the wireless device is in interactive mode, while in other embodiments, the wireless device may need to have the display on, the touchscreen/keypad unlocked, and one or more networking applications active in order to be in interactive mode. Any number/type/combination of activity indicators may be used according to various embodiments, as desired.

If none of the activity indicators are true, or in some embodiments, if not all required activity indicators are true, the wireless device may be determined to be in a 'non-interactive mode'. For example, in some embodiments, if the display is off, the touchscreen/keypad is locked, and no networking applications are active, the wireless device may be determined to be in non-interactive mode. Alternatively, the wireless device may be determined to be in non-interactive mode if no networking applications are active, even if the display is on and/or the touchscreen/keypad is unlocked. Other conditions may also or alternatively be used for determining that the wireless device is in non-interactive mode, as desired.

In 406, wireless network blacklisting criteria may be selected based on the monitored activity indicators. As noted above, in this context 'blacklisting' a wireless network may include not automatically attempting to join the network, even if the wireless network is on a list of preferred networks. Blacklisting a problematic wireless network may accordingly conserve battery which might otherwise be used in repeatedly automatically attempting to join the problematic wireless network even though it may not be possible to join the problematic wireless network at that time.

In some embodiments, the selected wireless network blacklisting criteria may be more aggressive in non-interactive mode and less aggressive in interactive mode. This may be desirable in order to strike a balance between conserving battery and providing a good user experience. For example, if the wireless device is in non-interactive mode (e.g., as a result of lack of user activity, such as indicated by the activity indicators), the battery-conserving benefits of an aggressive blacklisting policy may be obtained without negatively impacting the user's immediate user experience, since the user may not be interactively using the device at that time. This may in turn benefit the user's long term user experience, since when the user does begin actively using the wireless device, a higher level of battery life may remain. On the other hand, if the wireless device is in interactive mode (e.g., as a result of user activity, such as indicated by the activity indicators), a less aggressive blacklisting policy may provide better immediate user experience by providing more opportunity for obtaining network connectivity before determining that a wireless network is problematic and blacklisting the wireless network. The selected blacklisting criteria may include the occurrence of a certain type and/or number of connectivity issues with respect to a given wireless network, such as the types and thresholds of connectivity problems described with respect to step 408.

In 408, the wireless networks may be monitored for connectivity issues. The wireless networks may be monitored for any or all of several possible connectivity issues. One type of connectivity issue may include problems in initially attempting to connect to a network. For example, if the wireless device is at the edge of the wireless network, signal strength may be sufficient to discover the network, but insufficient to connect to the network. In this case, attempts to join the network may be unsuccessful. Similarly, if the wireless device attempts to join the network with invalid authentication criteria (e.g., as might be the case if the authentication criteria for the wireless network have changed), the attempts may be unsuccessful. Another possible connectivity issue could arise if the wireless device is able to connect to the wireless network, but becomes disconnected within a short time frame. For example, in a problematic Wi-Fi network, an access point might transmit deauthentication or disassociation frames to the wireless device, causing connectivity loss.

In case of such connectivity issues, it may be desirable to blacklist a wireless network with which the connectivity issues are occurring. Thus, according to some embodiments, the blacklisting criteria selected based on the activity indicators may include one or more connectivity issues. The number and/or type of connectivity issues may be different for a wireless device determined to be in interactive mode than for a wireless device determined to be in non-interactive mode.

One type of criteria for blacklisting a wireless network might include unsuccessful attempts to join the wireless network. There might be a first (e.g., lower, more aggressive) threshold for a wireless device in non-interactive mode and a second (e.g., higher, less aggressive) threshold for a wireless device in interactive mode, in some embodiments. For example, if the wireless device is in non-interactive mode, a single failed attempt to join a wireless network may be sufficient to blacklist the wireless network, while if the wireless device is in interactive mode, three failed attempts to join a wireless network may be necessary to blacklist the wireless network. Other numbers of attempts (e.g., two, four, etc) may be used as the first and second threshold as desired.

Another type of criteria for blacklisting a wireless network might include disconnections from the wireless network. For example, if the wireless device is able to join the network, but is disconnected a certain number of times within a certain time frame, the wireless network may be blacklisted. In this case, the number of disconnections meriting a blacklisting may be lower for a wireless device in non-interactive mode than for a wireless device in interactive mode, and/or the time frame meriting a blacklisting for a certain number of disconnections may be higher for a wireless device in non-interactive mode than for a wireless device in interactive mode. As one possible example, if the wireless device is in non-interactive mode, three connection losses within 30 minutes might be sufficient to blacklist the wireless network, while if the wireless device is in interactive mode, three connection losses within five minutes might be necessary to blacklist the wireless network. Different numbers of connection losses and/or different time thresholds (e.g., twice in 25 minutes, four times in 10 minutes, etc.) may be used as desired.

In 410, a wireless network may be blacklisted based on the selected criteria and connectivity issues. The wireless network may have undergone connectivity issues sufficient to meet the selected criteria for blacklisting the network. For example, the device may be in non-interactive mode and may have attempted and failed to join the wireless network once, or experienced disconnection from the network three times in 30 minutes. Or, as another example, the device may be in interactive mode and may have attempted and failed to join the wireless network three times, or experienced disconnection from the network three times in five minutes. As a result, the wireless network may be blacklisted.

Blacklisting the network may include storing information (e.g., in a 'blacklist') indicating that the network has been blacklisted, according to some embodiments. The wireless device may not automatically attempt to join the wireless network while it is blacklisted. In other words, even though the wireless network may be a 'preferred' network which the wireless device would ordinarily attempt to join, the wireless device may not automatically attempt to join the wireless network. As previously described, this may be desirable in the case of problematic networks for which it is not possible for the wireless device to join, in order to conserve battery life of the wireless device by avoiding continued automatic attempts to join the network which are likely to fail.

Under certain conditions, it may be desirable for a blacklisted wireless network to be 'un-blacklisted' or removed from the blacklist. For instance, it may be desirable to re-set (empty) the blacklist in case of events which are indicative of an increased level of user activity and/or user initiated attempts at networking, in order to provide the user with a better chance of obtaining wireless network connectivity. Examples of events which might re-set the blacklist (and un-blacklist any currently blacklisted wireless networks) might include unlocking of the wireless device (e.g., a touchscreen and/or keypad of the wireless device) and/or user-initiated launching of an application that uses networking capability (e.g., a web browser or email application). Additionally, in some embodiments, an individual wireless network may be removed from the blacklist (un-blacklisted) based on a successful user-initiated attempt to connect to the wireless network.

Additionally, in some embodiments signal strength indicators associated with wireless networks may be monitored. Such measurements may be useful if the wireless device unsuccessfully attempts to join a wireless network. In this case, if the signal strength indicators indicate that the signal strength of the wireless network is below a first signal strength threshold, this may be an indication that the wireless device is at the edge of the wireless network. If the signal strength is later measured and is determined to have improved sufficiently (e.g., by at least a second signal strength threshold), this may be an indication that the wireless device may have moved to within comfortable range of the network. As one example, the first signal strength threshold may be −65 dBm, and the second signal strength threshold may be 15 dBm, but those of skill in the art will recognize that any number of other values may be used as desired.

Note that according to various embodiments, the signal strength indicators used for a particular wireless network may depend on the type of wireless network. For example, for Wi-Fi networks, received signal strength indication (RSSI) measurements may be monitored; other signal strength indicators may be used for other types of networks.

Thus, in addition to the above-noted possible conditions for un-blacklisting a wireless network, in some cases a blacklisted wireless network may be removed from the blacklist (un-blacklisted) based on such changes to monitored signal strength indicators associated with the wireless network. Alternatively, monitoring signal strength indicators associated with the wireless network may be part of the automatic re-try process for attempting to join the wireless network (e.g., if a first attempt is unsuccessful, a next automatic attempt may not occur until signal strength indicators indicate that the network signal strength has sufficiently improved).

Once a wireless network has been removed from the blacklist (un-blacklisted), the wireless device may resume (automatic) attempts to join the wireless network. Note that the wireless network may be blacklisted again if resumed attempts to join the wireless network are unsuccessful and the criteria for blacklisting the wireless network are again met, which may occur if the problem(s) with the wireless network has not actually been resolved.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (e.g., a User Equipment or UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium comprising program instructions executable by a wireless device to:
   detect a wireless network;
   monitor one or more activity indicators of the wireless device;
   determine whether the wireless device is being used in an interactive mode or a non-interactive mode based on monitoring the one or more activity indicators of the wireless device;
   select one or more criteria for wireless network blacklisting, wherein the criteria are selected based on the one or more activity indicators, wherein the criteria comprise one or more types of connectivity problems,
   wherein the criteria for wireless network blacklisting comprise a first type of connectivity problem and a second type of connectivity problem, wherein the first type of connectivity problem comprises a failed attempt to join a wireless network, wherein the second type of connectivity problem comprises a disconnection from a wireless network,
   wherein the criteria for wireless network blacklisting selected for a wireless device in the interactive mode comprise a first number of connectivity problems of the first type, wherein the criteria for wireless network blacklisting selected for a wireless device in the non-interactive mode comprise a second number of connectivity problems of the first type, wherein the first number is larger than the second number;
   monitor the wireless network for the one or more types of connectivity problems;
   blacklist the wireless network based on the selected criteria and monitoring the wireless network for the one or more types of connectivity problems.

2. The memory medium of claim 1,
   wherein the wireless network is a preferred wireless network, wherein the wireless device is configured to automatically attempt to join the wireless network;
   wherein after the wireless network is blacklisted, the wireless device does not automatically attempt to join the wireless network.

3. The memory medium of claim 1, wherein the program instructions are further executable to:
   detect that the one or more activity indicators have changed;
   un-blacklist the wireless network based on detecting that one or more activity indicators have changed.

4. The memory medium of claim 1, wherein the one or more activity indicators comprise one or more of:
   a display status;
   a touchscreen or keypad lock status;
   a networking application status.

5. The memory medium of claim 1, wherein the program instructions are further executable to:
   determine that one or more connectivity problems have occurred with the wireless network based on monitoring the wireless network for the one or more types of connectivity problems.

6. A wireless device configured to modify its network connection policies based on user activity levels, the wireless device comprising:
   an antenna for performing wireless communications;
   a processor;
   a computer accessible memory medium comprising program instructions executable by the processor to:
   detect a wireless network;
   monitor one or more activity indicators of the wireless device;
   determine that the wireless device is being used at a first user activity level of a plurality of user activity levels based on monitoring the one or more activity indicators of the wireless device;
   select first criteria for wireless network blacklisting, wherein the first criteria are selected based on the one or more activity indicators, wherein the first criteria comprise one or more types of connectivity problems;
   wherein the first criteria for wireless network blacklisting are associated with the first user activity level and are selected based on determining that the wireless device is being used at the first user activity level, wherein second criteria for wireless network blacklisting are associated with a second user activity level, wherein the second criteria are different than the first criteria;
   monitor the wireless network for the one or more types of connectivity problems;
   blacklist the wireless network based on the first criteria and monitoring the wireless network for the one or more types of connectivity problems.

7. The wireless device of claim 6,
   wherein the wireless network is an IEEE 802.11 wireless network.

8. The wireless device of claim 6,
   wherein the plurality of user activity levels comprise at least:
   an interactive mode; and
   a non-interactive mode.

9. The wireless device of claim 6,
   wherein the first user activity level is a lower level of user activity than the second user activity level, wherein the first criteria for wireless network blacklisting are configured for more aggressive blacklisting of wireless networks than the second criteria for wireless network blacklisting.

10. The wireless device of claim 6, wherein the program instructions are further executable by the processor to:
monitor the one or more activity indicators of the wireless device;
determine, that the wireless device is being used at the second user activity level based on monitoring the one or more activity indicators of the wireless device;
de-blacklist the wireless network based on determining that the wireless device is being used at the second user activity level;
select the second criteria for wireless network blacklisting based on determining that the wireless device is being used at the second user activity level.

11. The wireless device of claim 10,
wherein the second criteria also comprise the one or more types of connectivity problems, wherein the second criteria comprise different connectivity problem thresholds than the first criteria for at least one of the one or more types of connectivity problems.

12. The wireless device of claim 11, wherein the program instructions are further executable by the processor to:
monitor the wireless network for the one or more types of connectivity problems;
blacklist the wireless network based on the second criteria and monitoring the wireless network for the one or more types of connectivity problems.

13. A non-transitory computer accessible memory medium comprising program instructions executable by a wireless device to:
detect a wireless network;
monitor one or more activity indicators of the wireless device;
determine whether the wireless device is being used in an interactive mode or a non-interactive mode based on monitoring the one or more activity indicators of the wireless device;
select one or more criteria for wireless network blacklisting, wherein the criteria are selected based on the one or more activity indicators, wherein the criteria comprise one or more types of connectivity problems,
wherein the criteria for wireless network blacklisting comprise a first type of connectivity problem and a second type of connectivity problem, wherein the first type of connectivity problem comprises a failed attempt to join a wireless network, wherein the second type of connectivity problem comprises a disconnection from a wireless network,
wherein the criteria for wireless network blacklisting selected for a wireless device in the interactive mode comprise a first number of connectivity problems of the second type, wherein the criteria for wireless network blacklisting selected for a wireless device in the non-interactive mode comprise a second number of connectivity problems of the second type, wherein the first number is larger than the second number;
monitor the wireless network for the one or more types of connectivity problems;
blacklist the wireless network based on the selected criteria and monitoring the wireless network for the one or more types of connectivity problems.

14. A non-transitory computer accessible memory medium comprising program instructions executable by a wireless device to:
detect a wireless network;
monitor one or more activity indicators of the wireless device;
determine whether the wireless device is being used in an interactive mode or a non-interactive mode based on monitoring the one or more activity indicators of the wireless device;
select one or more criteria for wireless network blacklisting, wherein the criteria are selected based on the one or more activity indicators, wherein the criteria comprise one or more types of connectivity problems,
wherein the criteria for wireless network blacklisting comprise a first type of connectivity problem and a second type of connectivity problem, wherein the first type of connectivity problem comprises a failed attempt to join a wireless network, wherein the second type of connectivity problem comprises a disconnection from a wireless network,
wherein the criteria for wireless network blacklisting selected for a wireless device in the interactive mode comprise a first number of connectivity problems of the second type occurring within a first period of time, wherein the criteria for wireless network blacklisting selected for a wireless device in the non-interactive mode comprise the first number of connectivity problems of the second type occurring within a second period of time, wherein the first period of time is smaller than the second period of time;
monitor the wireless network for the one or more types of connectivity problems;
blacklist the wireless network based on the selected criteria and monitoring the wireless network for the one or more types of connectivity problems.

15. A method for a wireless device to modify its network connection policies based on user activity levels, the method comprising:
detecting a wireless network;
monitoring one or more activity indicators of the wireless device;
determining that the wireless device is being used at a first user activity level of a plurality of user activity levels based on monitoring the one or more activity indicators of the wireless device;
selecting first criteria for wireless network blacklisting, wherein the first criteria are selected based on the one or more activity indicators, wherein the first criteria comprise one or more types of connectivity problems,
wherein the first criteria are associated with the first user activity level and are selected based on determining that the wireless device is being used at the first user activity level, wherein second criteria for wireless network blacklisting are associated with a second user activity level, wherein the second criteria are different than the first criteria;
monitoring the wireless network for the one or more types of connectivity problems;
blacklisting the wireless network based on the first criteria and monitoring the wireless network for the one or more types of connectivity problems.

* * * * *